United States Patent [19]

Hoffmann et al.

[11] 3,726,463
[45] Apr. 10, 1973

[54] APPARATUS FOR PRODUCING HELICALLY FORMED WELDED TUBE

[75] Inventors: Ralf Hoffmann, Dortmund-Solde; Helmut Weidner, Dortmund-Korne, both of Germany

[73] Assignee: Hoesch Maschinenfabrik Deutschland Aktiengesellschaft, Dortmund, Germany

[22] Filed: Sept. 13, 1971

[21] Appl. No.: 179,679

[30] Foreign Application Priority Data

Sept. 19, 1970 Germany................P 20 46 284.4

[52] U.S. Cl. ...............228/15, 29/477.3, 29/477.7, 93/80, 214/1 P, 219/62
[51] Int. Cl. ...............................................B23k 1/20
[58] Field of Search..........................228/4, 5, 15, 17; 29/33 D, 428, 477, 477.3, 477.7; 113/116; 219/8.5, 62; 93/77, 80, 81, 81 MT; 72/135; 214/1 P; 198/20

[56] References Cited

UNITED STATES PATENTS

| 3,636,827 | 1/1972 | Lindberg................................93/80 |
| 3,619,897 | 11/1971 | Oppermaun et al..............29/477 X |
| 3,548,141 | 12/1970 | Remus et al..........................219/62 |
| 3,423,003 | 1/1969 | Fletcher...............................228/15 |
| 3,210,980 | 10/1965 | Sengel..............................228/15 X |

Primary Examiner—J. Spencer Overholser
Assistant Examiner—Robert J. Craig
Attorney—Toren and McGeady

[57] ABSTRACT

Apparatus for producing tubing by welding helically formed metal strip comprises a mechanism for feeding the strip, a tube former which winds the metal strip helically to form the tube, a device for welding together the strip edges after it has been formed, a cutter for cutting the welded tube into lengths and a tube carrier for supporting these lengths of tube, the tube carrier being pivoted so that it can be swung to vary the angle between the axis of the formed tube and the direction in which the strip is fed, a receiver which receives the cut-off lengths of tube from the carrier and a conveyor for conveying the cut-off lengths from the receiver. The receiver is arranged so that each of the cut-off lengths of tube can be swung about the pivot axis of the tube carrier from a position parallel to the carrier and can also be swung about a second axis into a position in which each length of tube extends parallel to the conveyor which ten receives the tube and conveys it away.

4 Claims, 4 Drawing Figures

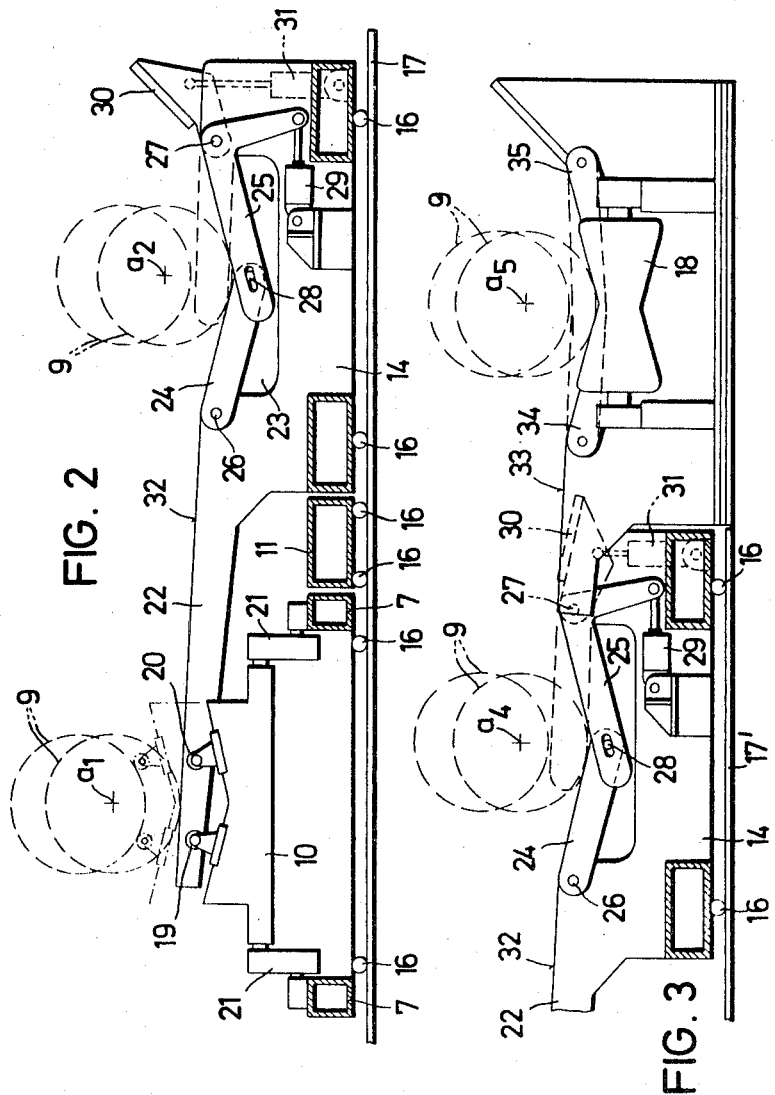

APPARATUS FOR PRODUCING HELICALLY FORMED WELDED TUBE

In the production of tubing by welding helically formed metal strip, the strip is continuously fed to a tube former, which is equipped with at least one welding device. After welding, the welded tube is cut into individual lengths. In order to form the helical tube, the strip has to be fed to the tube former in a direction at an angle to the axis of the tube. This angle, together with the width of the strip, determines the diameter of the formed tube. To produce tubes of different diameters, from strips of various widths, the angle between the strip and the tube must be variable. To vary the angle, either the direction of feeding of the strip or the orientation of the tube axis must be altered. In principal, either may be altered while the other remains stationary, and both techniques have been used in practice.

However, altering the feed direction has considerable disadvantages. The arrangement for feeding the strip consists of a number of complex mechanical devices, which are: a stand for supporting the coiled strip, means for exchanging coils or for mounting a fresh coil in the stand, a device for straightening the strip, a device for welding a fresh strip onto the end of the old one, a strip flattening machine, means for machining the strip edges and a driving apparatus for feeding the strip to the tube former. Between all of these devices are guides for accurately guiding the strip. Any arrangement for swinging this assembly of mechanisms would be expensive.

For these reasons there is a tendency in the industry to keep the feed direction stationary and alter the orientation of the tube axis to vary the angle. To move the tube axis, only a tube carrier and a cutter for cutting the tube into lengths have to be moved. This is therefore much simpler than changing the feed direction. However this technique also has a disadvantage, which is that the tube leaves the cutter at an angle to a conveyor which removes the cut-off lengths of tube and this angle is dependent on the tube diameter and strip width. Consequently the lengths of tube have to be lifted by a crane from the carrier on to the conveyor. Conveying long tubes by a crane, and the necessary swinging of the tube is a difficult operation which requires a special type of crane, controlled by a highly skilled crane operator. This solution is therefore also not entirely satisfactory with the apparatus so far used for putting it into effect.

The aim of this invention is to provide a tube producing apparatus in which the orientation of the tube axis is changeable, but in which the above disadvantages are overcome.

According to this invention, apparatus for producing tubing by welding helically formed metal strip comprises a mechanism for feeding the strip, a tube former which winds the strip helically to form the tube, a device for welding together the strip edges after it has been formed, a cutter for cutting the welded tube into lengths, a tube carrier for supporting the cut-off lengths of tube, the tube carrier being pivoted so that it can be swung to vary the angle between the axis of the formed tube and the direction in which the strip is fed, a receiver which receives the cut-off lengths of tube from the carrier and a conveyor for conveying the cut-off lengths of tube from the receiver, the receiver being arranged so that each cut-off length of tube can be swung about the pivot axis of the tube carrier from a position parallel to the carrier and can also be swung about a second axis into a position in which the cut-off length of tube extends parallel to the conveyor which then receives the tube and conveys it away. This arrangement entirely eliminates transportation by crane. It is ensured that the welded and cut off lengths of tube are always delivered in the same position, irrespective of tube diameter and strip width.

The apparatus is preferably constructed in either one of two different ways. In one example a second axis is located on a boom which supports the receiver and itself swings about the pivot axis of the tube carrier. This arrangement is constructionally simple, but when handling large tubes, difficulties arise in constructing a bearing for the receiver mounted on the boom. In a second example of the invention, the receiver comprises two parts which receive the cut-off lengths of tube successively, the first part being fixed to a boom which swings about the pivot axis of the tube carrier and the second part swinging about the second axis which is stationary, the two parts lying parallel to each other after the first part has swung away from the tube carrier and before the second part has swung into the position in which the cut-off lengths of tube extend parallel to the conveyor. This arrangement is more expensive in construction, but may be necessary if large tubes are to be handled.

The conveyor, which conveys the lengths of tube away preferably extends parallel to the direction of feeding of the strip. This saves further space.

Two examples of apparatus in accordance with the present invention are illustrated diagrammatically in the accompanying drawings in which:

FIG. 2 is a section along the line A-B in FIG. 1, but drawn to a larger scale than FIG. 1;

FIG. 3 is a section along the line C-D in FIG. 1, also drawn to a larger scale than FIG. 1; and, FIG. 4 is a plan of the second example.

Figure 1:
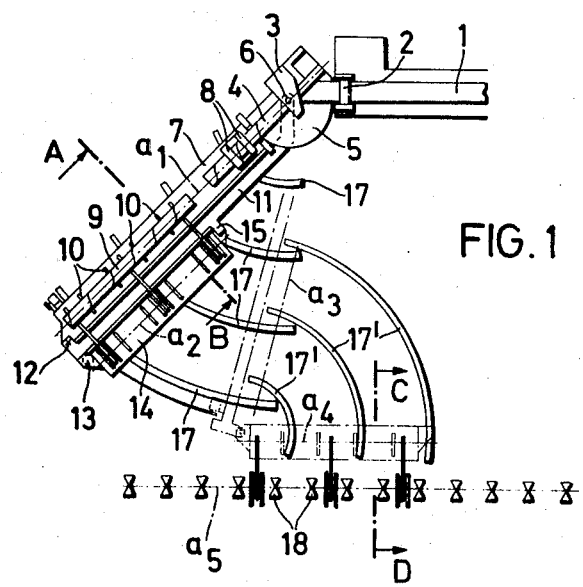
FIG. 1 is a plan of the first example.

In both the examples strip 1 is fed by driving rollers 2 to a tube former 3. The tube former 3 bends the strip to form a helix, which is welded along the strip edges to form the tube which is then cut into lengths. The helically formed welded tube 4 leaves the tube former 3 with its axis at an angle to the feed direction of the strip 1. This angle depends on the tube diameter and on the strip width. It must therefore be possible to vary this angle. The tube former 3 is mounted on a platform 5 which is pivoted so that it can be swung about an axis 6. A tube carrier 7, attached to the tube former 3, swings with the tube former and its platform 5. The tube carrier 7 supports a tube cutter 8 for cutting the continuously produced tube into individual lengths. A tube length which has been cut off is shown at 9 in FIGS. 1 and 4. After the tube length has been moved to positions where it rests on lifting beams 10, it is lowered by lowering the lifting beams.

In the example shown in FIGS. 1 to 3, a boom 11 is pivoted to swing about the axis 6 independently of the tube carrier 7. The outer end of the boom 11 is locked to the tube carrier 7 at the point 12, for example by an inserted pin, when the parts are in the positions shown in FIG. 1. Under these circumstances the boom 11 lies parallel to the tube carrier 7.

A receiver 14 is pivoted so that it can swing about a second axis 13 located on the outer end of the boom 11. A further lock 15 can be provided for locking the receiver 14 in a position parallel to the boom 11 and the tube carrier 7 as long as these parts are in the positions shown in FIG. 1. The receiver 14 receives the tube length 9 from the tube carrier 7 by means which are illustrated in FIG. 2 and will be described further. When the tube length 9 is transferred from the tube carrier to the receiver, its axis moves from the position $a_1$ to the position $a_2$.

After the tube length 9 has been transferred to the receiver 14, the lock 12 is opened and the boom 11 is swung about the axis 6, so as to bring the receiver 14, with the tube length 9, into a position in which the tube axis is at $a_3$. FIG. 1 does not show the tube length 9 in this position nor the receiver 14, but it does show a part of the angled boom 11 in chain lines. During the swinging movement, the angled boom 11 and the receiver 14 travel on rollers 16 (FIG. 2) which roll on curved rails 17.

With the tube axis now in the position $a_3$, the lock 15 is unlocked, whereupon the receiver 14 swings about the pivot axis 13 into the position represented by chain lines in FIG. 1, the tube axis reaching the position $a_4$ so that the tube length 9 is now parallel to the feed direction of the strip 1 and parallel to a conveyor 18. Finally the tube length 9 is transferred to the conveyor 18, bringing the tube axis into the position represented by the chain line $a_5$. The tube length is then conveyed away by the conveyor 18. The means used for transferring the tube length to the conveyor are illustrated in FIG. 3 and will be described further.

There are many known devices for transferring tube lengths to supports, or to platforms on supports, or to other platforms where the tubes move in a direction perpendicular to their axes. Examples of suitable devices are represented diagrammatically in FIGS. 2 and 3 and will now be described.

FIG. 2 shows a lifting beam 10 which has two rollers 19, 20 for supporting the tube length. The lifting beam 10 can be lifted and lowered by lifting levers 21 driven by a drive which is not represented in the drawing. Situated between the lifting beam 10 are arms 22 which are fixed to the receiver 14. The receiver 14 has a recess 23 in which arms 24 are pivoted on pins 26, and angled rocking levers 25 rock on a shaft 27. One arm of each rocking lever 25 is connected to a pivoted arm 24 by a pin-in-slot connection 28. The shaft 27 is common to all the rocking levers 25, so that they rock in unison. The angled rocking levers 25 are actuated by the piston of a hydraulic cylinder 29. Finally, pivoted on the shaft 27, is a stop plate 30 which is lifted and lowered by the piston of a hydraulic cylinder 31.

The tube length 9 is transferred from the position $a_1$ to the position $a_2$ as follows. The lifting beams 10 moves downwards, depositing the tube length onto the inclined surfaces 32 of the arms 22, over which the tube length rolls downwards and towards the right, as represented in FIG. 2. The tube length rolls into the shallow V formed by the parts 24 and 25, the tube length being prevented from rolling too far by the stop plate 30. This brings the tube length 9 into the position $a_2$.

When the receiver 14 has swung around, on the curved rails 17', until the tube axis has reached the position $a_4$, the parts are then in the positions represented in FIG. 3. In the next operation the tube length 9 is transferred from the receiver 14 to the conveyor 18 as follows. Actuation of the cylinder 31 lowers the stop plate 30 out of the way. Actuation of the cylinder 29 lifts the angled levers 25 and the pivoted arms 24, allowing the tube length to roll down and towards the right in FIG. 3, over the sloping upper surfaces of the rocking levers 25 and over sloping surfaces 33 which are fixed to the conveyor 18. This brings the tube length onto the supporting surfaces of a pair of levers 34, 35, which lower the tube length onto the conveyor 18. This brings the tube axis into the position $a_5$.

Figure 4:
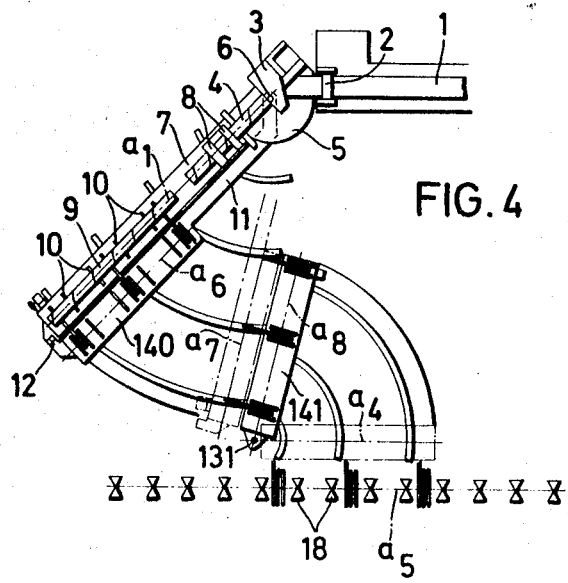

The example shown in FIG. 4 differs from that shown in FIG. 1 to 3 in that the receiver comprises two separate receivers which move independently of each other.

In FIG. 4, boom 11 swings about an axis 6. Corresponding parts in FIG. 4 have been given the same index numbers as in FIG. 1.

Fixed to the boom 11 in FIG. 4 is the first receiver 140, which, apart from the fact that it is fixed to the boom 11, corresponds in construction to the receiver 14 of FIG. 1. A second receiver 141 is pivoted to swing about a stationary axis 131. Transfer of the tube length 9 from the first receiver 140 to the second receiver 141 is effected by devices similar to those in FIGS. 2 and 3.

A tube length which is initially in the position represented in FIG. 4 is transferred in the manner described above to the first receiver 140, bringing the tube axis into the position $a_6$. The first receiver 140 swings around, with the boom 11, brings the tube axis into the position $a_7$. This brings the first receiver 140 adjacent and parallel to the second receiver 141. The tube length 9 is transferred, by means already described in connection with FIGS. 1 to 3 to the second receiver 141 where the tube axis assumes the position $a_8$. The second receiver 141 swings about its axis 131 into the position represented by chain lines in FIG, 4. This brings the tube axis into the position represented as $a_4$ in FIG. 1 and 4. The subsequent movements of the tube have already been described with reference to FIG. 1 to 3.

We claim:

1. In apparatus for producing tubing by welding helically formed metal strip, said apparatus comprising a mechanism for feeding said strip, a tube former for winding said strip helically to form said tube, a device for welding together the strip edges after it has been formed, a cutter for cutting the welded tubes into lengths, a tube carrier for supporting said lengths of tube, means pivotally mounting said tube carrier for swinging movement to vary the angle between the axis of said tube after formation thereof and the direction in which said strip is fed by said feeding mechanism, a receiver for receiving the cut-off length of tube from said carrier and a conveyor for conveying said cut-off lengths of tube from said receiver, the improvement comprising means pivotally mounting said receiver whereby each of said lengths of tube can be swung about the pivot axis of said tube carrier from a first position parallel to said carrier to a second position inclined to said carrier and pivotal means for swinging each of said lengths of tube about a second axis from said second position into a third position in which each of said lengths extends parallel to said conveyor, whereby said conveyor is able to receive said lengths of tube.

2. Apparatus as claimed in claim 1, further comprising a boom, means pivotally mounting said boom for swinging movement about said pivot axis of said carrier and means pivotally mounting said receiver on said boom at a point remote from said pivot axis of said carrier, whereby said receiver is able to swing on said boom to swing said lengths of tube from said second position to said third position.

3. Apparatus as claimed in claim 1, further comprising a boom, means pivotally mounting said boom for swinging movement about said pivot axis of said carrier and means fixedly mounting said receiver on said boom and wherein said means for swinging said lengths of tube from said second position to said third position include a second receiver, means pivotally mounting said second receiver for swinging movement about a stationary axis and means for transferring said lengths of tube from said receiver to said second receiver.

4. Apparatus as claimed in claim 1, further comprising means mounting said conveyor for conveying said lengths of tube in a direction parallel to the direction in which said strip is fed by said feeding mechanism to said tube former.

* * * * *